3,193,501
EXTREME PRESSURE LUBRICANT
COMPOSITIONS
Howard J. Matson, Harvey, Ill., assignor to Sinclair Research, Inc., Wilmington, Del., a corporation of Delaware
No Drawing. Filed Apr. 2, 1962, Ser. No. 184,544
3 Claims. (Cl. 252—46.7)

The present invention relates to oleaginous base lubricants possessing excellent extreme pressure and anti-wear properties.

Mineral oil and synthetic lubricants, in the form of greases or free-flowing liquids, are called upon to ease friction and prevent damage to machinery operated at temperatures up to as high as about 450° F. At elevated temperatures an internal combustion engine using these lubricants is an ideal oxidizing machine since the lubricant is violently agitated in the presence of air for long periods of time. In addition the stability of the lubricants is further drastically reduced due to contact with metallic surfaces which give up metallic particles to the lubricant that act as powerful oxidation catalysts. Furthermore, water also causes corrosion of metallic surfaces and accentuates oxidation of the lubricant. Aside from being stable under conditions of use the lubricant must exhibit anti-wear and load-carrying or extreme pressure characteristics.

It has now been discovered that certain compounds when added in small effective amounts to oleaginous base lubricating oils provide a lubricant composition with improved anti-wear and extreme pressure characteristics. The compounds added to the lubricants can be represented by the following general formula:

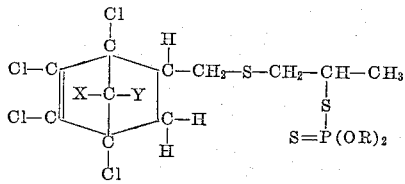

wherein X and Y are selected from the group consisting of chlorine and hydrogen and R is a saturated aliphatic hydrocarbon radical containing from 1 to 3 carbon atoms.

Any method known to the art for the preparation of these compounds can be employed. A method for their preparation is described in U.S. Patent No. 2,914,440 and involves the treatment of the 1:1 adduct of the appropriate chlorinated cyclopentadiene and diallyl sulfide with the O,O-dialkyl phosphorodithioate $HSSP(OR)_2$ wherein R is as defined above. The patent states that equimolar proportions of the reactants can be used but it seems desirable to use an excess of the acid. The reaction may be carried out satisfactorily without a solvent but inert solvents or diluents can be used if desired. The exact temperature at which the reaction is run is apparently not critical but reaction temperatures in the range of about normal room temperature to about 80° C. are preferred. The addition of a small amount of an oxidation inhibitor such as hydroquinone to the reaction mixture may be desirable. When the reaction is complete, the mixture is taken up in a suitable solvent such as an aromatic hydrocarbon and is washed with a dilute aqueous solution of a base such as sodium carbonate to remove any unreacted acid. The solution is then washed with water and dried and the solvent is distilled off.

The adducts of the chlorinated cyclopentadienes and diallyl sulfide useful as starting materials in the preparation of the compounds of this invention can be prepared from the sulfide and hexachlorocyclopentadiene, 1,2,3,4,5-pentachlorocyclopentadiene, or 1,2,3,4-tetrachlorocyclopentadiene. The latter two chlorinated cyclopentadienes can be obtained, for example, by the catalytic hydrogenation of hexachlorocyclopentadiene in the presence of a platinum group metal catalyst as described by McBee and Smith, Journal of American Chemical Society 77, 389 (1955). When hexachlorocyclopentadiene is used as the starting material, both X and Y are chlorine atoms in the final products. When 1,2,3,4,5-pentachlorocyclopentadiene is used, one of X or Y is a chlorine atom and the other is a hydrogen atom. When 1,2,3,4-tetrachlorocyclopentadiene is used, both X and Y are hydrogen atoms.

The reaction between the chlorinated cyclopentadiene and diallyl sulfide can be carried out with approximately equal molar ratios of reactants or with an excess of either reactant. The temperature at which the adduction reaction is carried out is apparently not critical, but temperatures in the range between about 80° and 140° C. are preferred. While the reaction takes place satisfactorily without a solvent, inert solvents or diluents can be employed. The reaction is generally complete in a few hours, and the product can be isolated by distilling off any solvent and fractionating the residue in vacuo.

The manner in which the compounds of this invention can be prepared is illustrated in the following examples:

EXAMPLE I

Preparation of the 1:1 adduct of diallyl sulfide and hexachlorocyclopentadiene

Hexachlorocylopentadiene (136.34 g.; 0.5 mole) was heated to a temperature of about 130° C. in a 3-necked round-bottomed flask fitted with a reflux condenser, mechanical stirrer, internal thermometer, and separatory funnel. Diallyl sulfide (57.10 g.; 0.5 mole) was added dropwise with stirring at such a rate as to maintain the temperature at about 130° C. After the sulfide had been added, the mixture was heated at 160° C. for 1 hour. The cooled reaction mixture was then distilled in vacuo. The distillate was refractionated to give the desired adduct having a boiling point of 144–145° C. at 0.3 mm. pressure.

EXAMPLE II

Preparation of 2,3,4,5,7,7-hexachloro-1,2,5,6-tetrahydro-2,5-methanobenzyl 2-(O,O-dimethylphosphorodithio)-propyl sulfide A mixture of the 1:1 adduct (30 g.; 0.078 mole) of diallyl sulfide and hexachlorocyclopentadiene, O,O-dimethyl phosphorodithioate (16 g.; 0.1 mole), and 0.1 g. of hydroquinone was heated at 65° C. for 17 hours in a round-bottomed flask fitted with a mechanical stirrer, internal thermometer, and reflux condenser. The temperature was then raised to 79° C. for 8 hours. The cooled reaction mixture was dissolved in benzene and washed first with 10% sodium carbonate solution and then with water. The benzene solution was dried over anhydrous sodium sulfate and filtered, after which the benzene was distilled off in vacuo, first with a water aspirator and then with a mechanical vacuum pump. The brown residue was filtered through Super-Cel (a diatomaceous silica filtering aid) to give 28 g. of 2,3,4,5,7,7-hexachloro-1,2,5,6-tetrahydro-2,5-methanobenzyl 2-(O,O-dimethylphosphorodithio)-propyl sulfide, a viscous oil having an index of refraction (D line) at 24° C. of 1.5746. Analysis for $C_{13}H_{17}Cl_6O_2PS_3$: Theory—Cl, 39.03%; P, 5.69%; S, 17.65%. Found—Cl, 40.03%; R, 5.23%; S, 17.01%.

Examples of other compounds which fall within the scope of this invention and can be prepared in the manner described above are as follows: 2,3,4,5,7-pentachloro-1,2,5,6 - tetrahydro - 2,5-methanobenzyl 2-(O,O-dimethylphosphorodithio) propyl sulfide; 2,3,4,5 - tetrachloro-1,2,5,6 - tetrahydro - 2,5-methanobenzyl 2-(O,O-dimethylphosphorodithio)propyl sulfide; 2,3,4,5,7,7 - hexachloro - 1,2,5,6-tetrahydro-2,5-methanobenzyl 2-(O,O-diethylphosphorodithio)propyl sulfide; 2,3,4,5,7-pentachloro-1,2,5,6-tetrahydro-2,5-methanobenzyl 2-(O,O-diethylphosphorodithio)propyl sulfide; 2,3,4,5-tetrachloro-1,2,5,6-tetrahydro-2,5 - methanobenzyl 2 - (O,O-diethylphosphorodithio)propyl sulfide; 2,3,4,5,7,7-hexachloro-1,2,5,6-tetrahydro-2,5-methanobenzyl 2 - (O,O-di-n-propylphosphorodithio)propyl sulfide; 2,3,4,5,7 - pentachloro - 1,2,5,6-tetrahydro-2,5-methanobenzyl 2 - (O,O-di-n-propylphosphorodithio)propyl sulfide; 2,3,4,5-tetrachloro-1,2,5,6-tetrahydro-2,5-methanobenzyl 2-(O,O-di-n-propylphosphorodithio)propyl sulfide; 2,3,4,5,7,7 - hexachloro - 1,2,5,6-tetrahydro-2,5-methanobenzyl 2-(O,O-diisopropylphosphorodithio)propyl sulfide.

The lubricating oil base stock used in the present invention is of lubricating viscosity and can be, for instance, a solvent extracted or solvent refined oil obtained in accordance with conventional methods of solvent refining lubricating oils. Generally, lubricating oils have viscosities from about 20 to 250 SUS at 210° F. The base oil may be derived from paraffinic, naphthenic, asphaltic or mixed base crudes, and if desired, a blend of solvent-treated Mid-Continent neutrals and Mid-Continent bright stocks may be employed. The oils may be thickened to grease consistency.

The base oil of the fluid lubricant or grease may be a synthetic oil of lubricating viscosity. One type of synthetic oleaginous base used is an ester synthetic oil of lubricating viscosity which consists essentially of carbon, hydrogen and oxygen, e.g. di-2-ethylhexyl sebacate. Various of these lubricating materials have been described in the literature and generally their viscosity ranges from the light to heavy oils, e.g. about 50 SUS at 100° F. to 250 SUS at 210° F. and preferably 30 to 150 SUS at 210° F. These esters are of improved thermal stability, low acid number and high flash and fire points. The complex esters, diesters, monoesters and polyesters may be used alone or to achieve the most desirable viscosity characteristics, complex esters, diesters and polyesters may be blended with each other or with naturally-occurring esters like castor oil to produce lubricating compositions of wide viscosity ranges which can be "tailor-made" to meet various specifications. This blending is performed, for example, by stirring together a quantity of diester and complex ester at an elevated temperature, altering the proportions of each component until the desired viscosity is reached.

These esters are prepared fundamentally by the action of acids on alcohols. The mere mixture of an alcohol and acid at the proper temperature will react to produce an equilibrium mixture which includes the monoester. The same is true for the reactions of organic dibasic acids and glycols to produce synthetic lubricant polyester bright stock. The diesters are frequently of the type alcohol-dicarboxylic acid-alcohol, while complex esters are generally of the type X–Y–Z–Y–X in which X represents a monoalcohol residue, Y represents a dicarboxylic acid residue and Z represents a glycol residue and the linkages are ester linkages. These esters have been found to be especially adaptable to the conditions to which turbine engines are exposed, since they can be formulated to give a desirable combination of high flash point, low pour point, and high viscosity at elevated temperature, and need contain no additives which might leave a residue upon volatilization. In addition, many complex esters have shown good stability to shear. Greases which use these esters as the oleaginous base also have most of these characteristics.

Suitable mono- and dicarboxylic acids used to make synthetic ester lubricant bases can be branched or straight chain and saturated or unsaturated and they frequently contain from about 2 to 12 carbon atoms. The alcohols usually contain from about 4 to 12 carbon atoms. In general, the useful glycols include the aliphatic monoglycols of 4 to 20 or 30 carbon atoms, preferably 4 to 12.

The compositions of this invention incorporate a small, minor amount of the above described additives sufficient to provide the base oil of lubricating viscosity which is the major portion of the composition with improved anti-wear and extreme pressure properties. This amount is generally about 0.01 to 15 or 20% or more depending on the particular base oil used and its application. The preferred concentration should be the minimum amount to give the desired properties for the particular application and usually will be about 0.2 to 5%. In some cases where oil solubility might limit the amount of additive employed, dispersants may be used to increase the concentration. In these cases, it has been found that increased solubility is best obtained in highly refined oils by dissolving the dispersant in the oil before dissolving the additive.

Materials normally incorporated in lubricating oils and greases to impart special characteristics can be added to the composition of this invention. These include corrosion inhibitors, additional extreme pressure agents, anti-wear agents, etc. The amount of additives included in the composition usually ranges from about 0.01 weight percent up to about 20 or more weight percent, and in general they can be employed in any amounts desired as long as the composition is not unduly deleteriously affected.

The following example is included to illustrate the advantages of the compounds of the present composition in lubricant compositions.

EXAMPLE I

1% by weight of 2,3,4,5,7,7-hexachloro-1,2,5,6-tetrahydro - 2,5 - methanobenzyl 2-(O,O-dimethylphosphodithio) propyl sulfide, the product of Example II above, was incorporated in an oil blend (defined in Table I below) and the lubricant composition was subjected to the Falex breakdown test and the Shell 4-ball extreme pressure and wear tests. For comparison, the base oil without the additive of the present invention was also tested. The results of the tests are shown in Table I.

TABLE I

|  | Additive conc., wt. percent | |
| --- | --- | --- |
|  | I | II |
| Base Oil [1] | None | 1.0 |
| Results: |  |  |
| Falex Breakdown Test, lbs | 1,250 | 3,000 |
| Shell 4-Ball Wear Test, scar diam., mm. (7 kg. 2 hrs., 110° C., 640 gms.) | 0.57 | 0.28 |
| Shell 4-Ball EP, MHL | 19.0 | 32.2 |
| Weld point, kg | 158 | 200 |

[1] Base oil is a blend of 70% of a solvent refined Mid-Continent bright stock having a viscosity of 120 SUS at 210° F. and a viscosity index of 85 and 30% of a solvent refined Mid-Continent neutral oil having a viscosity of 200 SUS at 100° F. and a viscosity index of 85.

EXAMPLES II AND III

Essentially the same results can be obtained employing in the base oil of Example I 1% by weight of:

(A) 2,3,4,5 - tetrachloro - 1,2,5,6 - tetrahydro - 2,5-methanobenzyl 2-(O,O - dimethylphosphorodithio)propyl sulfide; or (B) 2,3,4,5,7 - pentachloro - 1,2,5,6 - tetrahydro - 2,5-methanobenzyl 2-(O,O - dimethylphosphorodithio)propyl sulfide.

I claim:

1. An oleaginous lubricant composition consisting essentially of a base oil of lubricating viscosity and an amount sufficient to give improved extreme pressure properties to the composition of a compound having the structural formula:

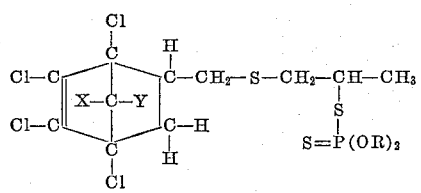

wherein X and Y are selected from the group consisting of chlorine and hydrogen atoms and R is a saturated hydrocarbon radical containing from 1 to 3 carbon atoms.

2. The composition of claim 1 wherein the base oil is a mineral oil of lubricating viscosity.

3. The composition of claim 2 wherein the compound is in the range of about 0.2 to 5% by weight of the lubricant composition.

References Cited by the Examiner
UNITED STATES PATENTS

| 2,223,793 | 12/40 | Peery | 252—46.7 |
| 2,226,420 | 12/40 | Badertscher et al. | 252—46.7 |
| 2,494,332 | 1/50 | Cyphers | 252—46.7 |
| 2,760,937 | 8/56 | McDermott | 252—46.7 |
| 2,881,196 | 4/59 | Fields | 252—46.7 X |
| 2,914,440 | 11/59 | Utermohlen | 260—461.112 |
| 2,970,110 | 1/61 | Fields | 252—46.7 X |
| 2,991,250 | 7/61 | Socolofsky | 252—46.7 |
| 3,020,305 | 2/62 | Chupp | 252—46.7 X |

DANIEL E. WYMAN, *Primary Examiner.*